J. F. QUESADA.
TOBACCO MACHINE.

No. 180,789.                    Patented Aug. 8, 1876.

Witnesses
J. W. Certhel
Chas. F. Meisner

Inventor:
Joseph F. Quesada
per
Herthel & Co.

UNITED STATES PATENT OFFICE.

JOSE F. QUESADA, OF ST. LOUIS, MISSOURI.

IMPROVEMENT IN TOBACCO-MACHINES.

Specification forming part of Letters Patent No. 180,789, dated August 8, 1876; application filed January 26, 1876.

*To all whom it may concern:*

Be it known that I, JOSE F. QUESADA, of St. Louis, Missouri, have invented an Improved Machine for Manufacturing Smoking-Tobacco, of which the following is a specification:

My invention has for its objects the utilization of the strips or stems of leaf-tobacco, and to convert said stems into smoking-tobacco.

This invention relates to an improved construction and combination of parts, such as rollers, roll-cutters, driving-gear, to operate for purposes of flattening stems of tobacco, cutting same lengthwise and crosswise, to achieve the objects herein set forth.

Figure 1:
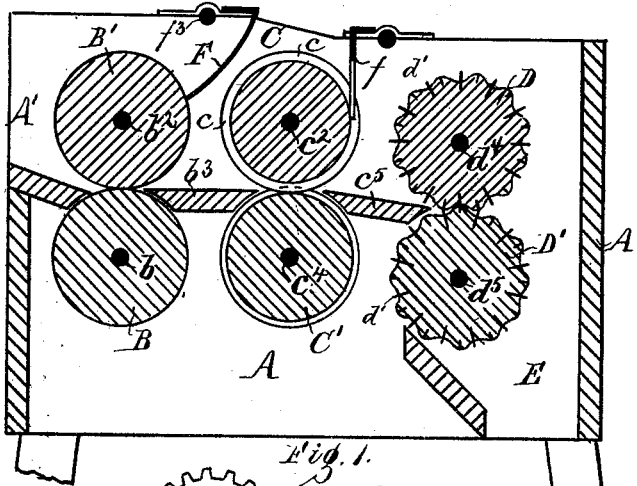
Figure 2:
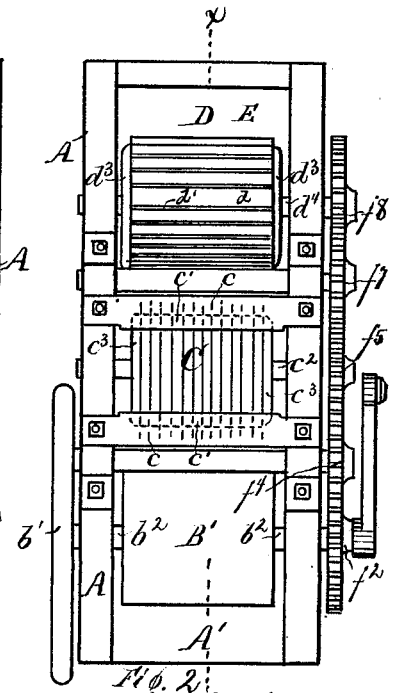
Figure 3:
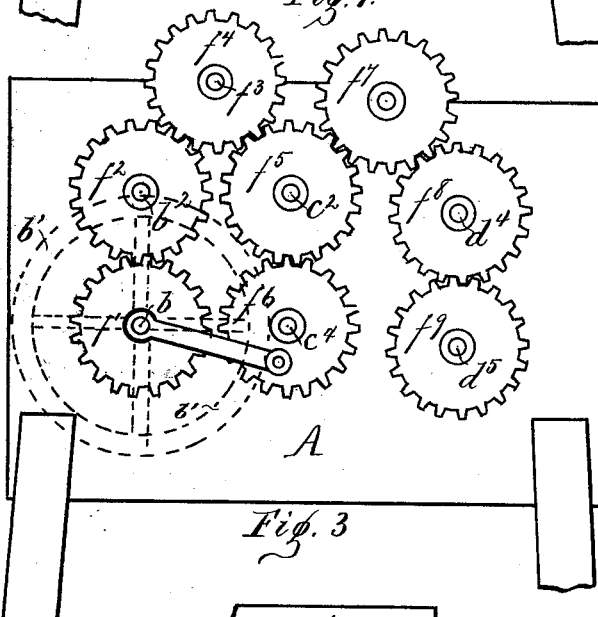
Figure 4:
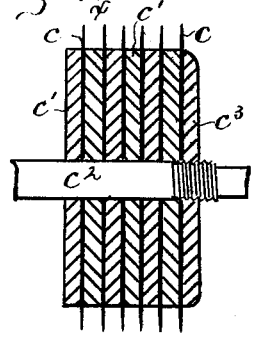
Figure 5:
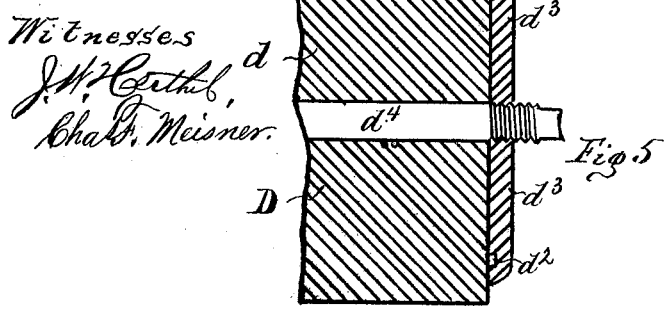

Of the drawing, Figure 1 is a sectional elevation on line $x\ x$ of Fig. 2. Fig. 2 is a top plan. Fig. 3 is a side elevation, showing driving-gear. Figs. 4 and 5 respective detail views of constructing the rotary cutters.

A represents a suitable box or frame to contain the operating parts. At A' the feed-trough is shown. B is the lower driving-roller. This is on a shaft, $b$, which is supported in proper bearings in the box A. On one end the driving-shaft carries a fly-wheel, $b^1$, (see dotted lines, Fig. 3,) and on the opposite end the driving power is connected, as will hereinafter appear. The roller B has a smooth cylinder-surface, and is arranged to the feed-entrance A', as shown in Figs. 1 and 2. B' is the upper roller. This likewise is on a shaft, $b^2$, supported in proper journal-bearings; also, said roller has the same smooth cylinder-surface, and is arranged immediately top of the roller B, and with relation to the feed-entrance, as shown in Figs. 1 and 2. The purpose of these rollers B B' is to take hold of the stems of tobacco to crush, flatten, or leaf same during the time they are fed through said rollers. The stems thus acted upon by the rollers B B' pass along top of the bottom board $b^3$ (see Fig. 1) to reach and be acted upon by the center-roller cutters. C represents the center-roller cutter. (See Figs. 1, 2, 3.) It consists of circular knife-blades $c$, and between each of these is placed a section of a roller, $c^1$. (See Figs. 1, 2, 4.) Next, through these parts $c\ c^1$, center, is passed the shaft $c^2$, and in order to secure the blades and roller-sections the outer caps $c^3$, Figs. 2 and 4, are provided with screw-threads, Fig. 4, and screwed on each end of the shaft, as indicated. The caps, tightly screwed on, brace the sections against the cutter-blades, and there are held immovable. The knife-edges partly protrude (see Figs. 1 and 4) to cut as the stems pass through the surface of the sections.

In this way the cutters C can readily be made of the desired width; also, can be taken apart and replaced, as repairs necessitate. Its shaft $c^2$ turns in proper journal-bearings. The purpose of the center-roller cutter C is to cut the stems lengthwise or longitudinally, and hence this arrangement of its blades. It is also to feed on its cut stems to the remaining cutters. Immediately, therefore, under C is a further roller, C', turning by its shaft $c^4$. The knife-edges of the cutter C slightly enter the surface of this roller C', and this, besides serving to feed the stems, also serves to clean said knife-edges. From between the center cutter C and roller C' the cut stems are next passed top of a board, $c^5$, (see Fig. 1,) to the remaining cutters, for final cutting. The last cutters referred to are D D'. (See Fig. 1.) They are also roller-cutters—that is, each consisting of blades inserted and held fast in the body of the roller.

As they are both alike in construction, I will only describe that of D. Let $d$ represent the roller-body. This I slit, so as to receive at points equidistant the cutter-blades $d^1$. (See Figs. 1, 2, 5.) Further, the outer sides or edges of the blades $d^1$ 1 form to present a lug, $d^2$. (See Fig. 5.) When the blades are inserted in the roller $d$, these lugs project, in order to engage the side caps $d^3$. (See Figs. 1, 2, 5.) These caps, further, have an annular groove in line with the lugs, (see Fig. 5,) and hence said lugs are retained, preventing the blade from being depressed or raised. The shaft $d^4$ passes through the center, and the side caps $d^3$ are also secured in position against the sides of the roller, which completes the upper cutter D ready for operation, its shaft turning in the housing. The lower similar roller-cutter D', by its shaft $d^5$, turns in the housing.

It will be noticed that the cutters $d^1$ of both D D' run, or are arranged crosswise, the object being, as stated, to cut the tobacco crosswise, forming, in connection with the cuts lengthwise, those small pieces or particles of tobacco, viz , smoking-tobacco. As the roller-cutters D D' are one above the other, they also cause the cut tobacco to pass through them, in order to be finally dropped out of the incline-discharge at E, Fig. 1. The roller bodies of D and D' are angular at the point where the cutters are inserted, (see Fig. 1,) and so as to utilize the full cutting action; also, it will be noticed that the cutters of the lower one, D', come in contact with the upper one, D, just midway between its blades. This gives the requisite cut as to the size of the particles forming smoking-tobacco. F is a guard-plate, (see Fig. 1,) its lower edge coming near in contact with the upper roller B, in order to free its surface from tobacco. At $f$ is shown a comb in contact with the knife-edges of the roller-cutter C, serving also to clean and comb said knife-edges. Otherwise, guard-plates on covers $c\ c$ protect the space between the housing and the roller and roller-cutter sides, so as to prevent the stems or tobacco from finding a lodging, or choking the rotation of these parts.

The driving-power to operate my machine can be hand or steam, or any ordinary power, and is applied to the driving-shaft having the crank. (Shown in Fig. 3.) This driving-shaft carries a spur-gear, $f^1$, made to gear with the next spur-gear $f^2$ on the shaft of the upper roller B. Further, top of the machine is a shaft, $f^3$, carrying also a spur-gear, $f^4$. This meshes with the gear $f^2$; also, the gear $f^5$ on the shaft of the rotary cutter C. The gear $f^5$ also meshes with the gear $f^6$ to drive the lower roller C'; also, the gear $f^5$ meshes with the next top gear $f^7$, which is on a separate top shaft, turning top of the boxing A. This top gear $f^7$, meshing with the gear $f^8$ on the shaft of the upper-roller cutter D, causes the latter gear to impart rotation to the lower cutter D' by means of its spur-gear $f^9$, and all of which is shown in Fig. 3.

In this wise the operation of the rollers proper and roller-cutters will be in reverse directions, facilitating the feeding through the machine of the stems, and enabling the application of the power to be at one shaft.

The operation of my invention is simple, and most effective in cutting the stems, and by its means the extra expense incurred in wasting the stems of leaf-tobacco can be avoided, as well as being a ready manner of economizing time, labor, and expense in utilizing said tobacco.

What I claim is—

An improved tobacco-machine, consisting of the rollers B B' C', roll-cutters C D D', arranged with relation to each other, and to feed and discharge entrances A' E, the guard F, comb $f$, and driving-gear, all said parts being combined and constructed as shown and described, to operate in the manner and for the purpose set forth.

In testimony of said invention I have hereunto set my hand.

JOSE F. QUESADA.

Witnesses:
WILLIAM W. HERTHEL,
GEORGE WEIDNER.